US011945273B2

(12) United States Patent
Furuta

(10) Patent No.: US 11,945,273 B2
(45) Date of Patent: *Apr. 2, 2024

(54) PREVIEW DAMPING CONTROL APPARATUS AND METHOD FOR A VEHICLE

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 277 days.

This patent is subject to a terminal disclaimer.

(21) Appl. No.: 17/494,378

(22) Filed: Oct. 5, 2021

(65) Prior Publication Data

US 2022/0105771 A1 Apr. 7, 2022

(30) Foreign Application Priority Data

Oct. 7, 2020 (JP) .................................. 2020-170064

(51) Int. Cl.
*B60G 17/016* (2006.01)
*B60G 17/018* (2006.01)
*B60G 17/019* (2006.01)

(52) U.S. Cl.
CPC ....... *B60G 17/0161* (2013.01); *B60G 17/018* (2013.01); *B60G 17/01908* (2013.01); *B60G 2400/0514* (2013.01)

(58) Field of Classification Search
CPC .............. B60G 17/0161; B60G 17/018; B60G 17/01908; B60G 2400/0514

USPC .......................................................... 701/37
See application file for complete search history.

(56) References Cited

U.S. PATENT DOCUMENTS

| 2007/0260438 | A1* | 11/2007 | Langer | G01M 17/007 |
| | | | | 703/8 |
| 2014/0195112 | A1 | 7/2014 | Lu et al. | |
| 2016/0362133 | A1 | 12/2016 | Auden | |
| 2017/0129298 | A1* | 5/2017 | Lu | B60G 17/015 |
| 2018/0015801 | A1* | 1/2018 | Mohamed | H04L 67/12 |

(Continued)

FOREIGN PATENT DOCUMENTS

| CN | 106240629 A | * | 12/2016 | ............. | B62D 17/00 |
| DE | 102014200031 A1 | * | 7/2014 | ........... | B60G 17/015 |

(Continued)

*Primary Examiner* — Mahmoud Gimie
(74) *Attorney, Agent, or Firm* — Sughrue Mion, PLLC

(57) ABSTRACT

A damping force control apparatus for a vehicle in which road surface displacement-related information detected by an in-vehicle detection device is transmitted to a preview reference database control device together with detection position information, a preview reference database including road surface displacement-related values is made, preview damping control that reduces vibration of a sprung of the vehicle is performed using the road surface displacement-related values in the preview reference database, and it is assumed that a road surface displacement-related value in a predetermined adjacent region located in a direction crossing a traveling direction of the vehicle with respect to a point where the road surface displacement-related information was detected by the in-vehicle detection device is the same as the road surface displacement-related value at the above point.

12 Claims, 7 Drawing Sheets

(56) References Cited

U.S. PATENT DOCUMENTS

2018/0154723 A1 6/2018 Anderson et al.
2022/0105770 A1* 4/2022 Furuta .................... B60G 17/06

FOREIGN PATENT DOCUMENTS

| JP | 2009-257812 A | 11/2009 |
| JP | 2016-111501 A | 6/2016 |
| JP | 2017-226270 A | 12/2017 |

* cited by examiner

PREVIEW DAMPING CONTROL APPARATUS AND METHOD FOR A VEHICLE

CROSS-REFERENCE TO RELATED APPLICATION

This application claims priority to Japanese Patent Application No. JP2020-170064 filed on Oct. 7, 2020, the content of which is hereby incorporated by reference in its entirety into this application.

BACKGROUND

1. Technical Field

The present disclosure relates to a preview damping control apparatus and method for a vehicle such as an automobile.

2. Description of the Related Art

A preview damping control is a control which reduces vibration of a sprung of a vehicle by controlling a force acting between the sprung and an unsprung based on road surface information such as a vertical displacement of a road surface in front of the vehicle in order to compensate for a control delay, that is, a control that pre-reads road surface information and controls a damping force. As a means of pre-reading information, it is known that road surface information is stored in a cloud to build a database, and road surface information is acquired from the database by communication when a vehicle is traveling. As an example of this type of preview damping control, for example, as described in U.S. Unexamined Patent Application Publication No. 2018/0154723, a preview damping control that acquires road surface information by a sensor such as an in-vehicle camera or a radar sensor is known.

According to sensors such as a camera and a radar sensor, it is possible to acquire road surface information in front of a vehicle over a relatively wide range that crosses a traveling direction of the vehicle. Road surface information in front of a vehicle can also be acquired by a laser sensor, and according to a sensor that detects a vertical motion state quantity of a vehicle such as an unsprung acceleration sensor, it is possible to acquire a vertical displacement of an unsprung and its derivative value as road surface information at a wheel position.

According to a laser sensor and a sensor that detects a motion state quantity in the vertical direction of a vehicle, it is possible to acquire road surface information more accurately than the sensors such as a camera and a radar sensor. Therefore, according to a preview damping control using road surface information acquired by a laser sensor or a motion state quantity detection sensor, compared with a preview damping control using road surface information acquired by a camera, a radar sensor or the like, a vibration of a sprung can be effectively reduced.

However, a lateral range in which road surface information can be acquired by a laser sensor and a motion state quantity detection sensor, that is, a range in a direction crossing a traveling direction of a vehicle is much narrower than that of sensors such as a camera and a radar sensor. Therefore, in order to build an effective database that stores road surface information over the entire width of roads and lanes, there is a technical problem that a large number of vehicles must travel on the same road at various lateral positions and a large amount of road surface information must be acquired by a laser sensor or the like.

SUMMARY

One of the objects of the present disclosure is to provide a preview damping control apparatus and method capable of pre-reading effective road surface information and damping a sprung without requiring a large number of vehicles to travel on the same road at various lateral positions.

The present disclosure provides a preview damping control apparatus for a vehicle comprising:

- an in-vehicle control device including a road surface displacement-related information detection device that detects road surface displacement-related information related to a vertical displacement of at least one of a position of a wheel and a position in front of the wheel while the vehicle is traveling, and a first control unit that controls the road surface displacement-related information detection device,
- a preview reference database control device including a storage device that stores a preview reference database and a second control unit that controls the storage device,
- the first control unit is configured to associate the road surface displacement-related information detected by the road surface displacement-related information detection device with a position information capable of identifying a position where the road surface displacement-related information was detected, and send the associated information to the second control unit,
- the second control unit is configured to calculate a road surface displacement-related value related to a vertical displacement of a road surface based on detected road surface displacement-related information transmitted from the vehicle or other vehicles, and store a set of data of the road surface displacement-related value and corresponding position information associated with each other in the storage device as a part of the preview reference database, and
- the first control unit is further configured to perform preview damping control for reducing vibration of a sprung of the vehicle by using the road surface displacement-related value and the position information in the preview reference database.

At least one of the first and second control units is configured to assume that a road surface displacement-related value in a predetermined adjacent region located in the direction crossing a traveling direction of the vehicle with respect to a point where the road surface displacement-related information was detected by the road surface displacement-related information detection device is the same as a road surface displacement-related value at the point.

According to the above configuration, road surface displacement-related information detected by the road surface displacement-related information detection device and position information capable of identifying a position where the road surface displacement-related information was detected are associated and transmitted to the second control unit. In addition, a road surface displacement-related value related to a vertical displacement of a road surface is calculated based on detected road surface displacement-related information transmitted from the vehicle or other vehicles, and a set of data of the road surface displacement-related value and the corresponding position information associated with each other is stored in the storage device as a part of the preview reference database. Further, preview damping control for reducing a vibration of the sprung of the vehicle is performed by using the road surface displacement-related value and the position information in the preview reference database.

Therefore, the first control unit can reduce a vibration of the sprung of the vehicle by pre-reading a road surface displacement-related value and corresponding position information in the preview reference database stored in the storage device by communication and performing the preview damping control.

In general, there is a high possibility that a road surface displacement-related value at a point where road surface displacement-related information was detected by the road surface displacement-related information detection device and a road surface displacement-related value in a region adjacent thereto, particularly in an adjacent region located in a direction crossing a traveling direction of the vehicle, are the same. Therefore, a road surface displacement-related value in a predetermined adjacent region located in a direction crossing a traveling direction of the vehicle with respect to a point where the road surface displacement-related information was detected may be considered to be the same as the road surface displacement-related value at the point.

According to the above configuration, a road surface displacement-related value in a predetermined adjacent region located in a direction crossing a traveling direction of the vehicle with respect to a point where the road surface displacement-related information was detected by the road surface displacement-related information detection device is assumed to be the same as the road surface displacement-related value at the point.

Therefore, not only a road surface displacement-related value at the point where the road surface displacement-related information was detected by the road surface displacement-related information detection device is specified, but also a road surface displacement-related value in a predetermined adjacent region is also specified to be a road surface displacement-related value calculated based on the detected road surface displacement-related information. Therefore, the preview damping control can be performed using a set of data for a point where road displacement-related information was detected and a predetermined adjacent region, so that it is possible to pre-read effective road surface displacement-related values and dampen the sprung without requiring a large number of vehicles to travel on the same road in various lateral positions.

In one aspect of the present disclosure, the second control unit is configured to store a set of assumed data in which an assumed road surface displacement-related value and position information capable of specifying a position in a predetermined adjacent region are associated with each other for the predetermined adjacent region in the storage device as a part of the preview reference database.

According to the above aspect, a set of assumed data in which an assumed road surface displacement-related value and position information capable of specifying a position in a predetermined adjacent region are associated with each other for the predetermined adjacent region is stored in the storage device as a part of the preview reference database. Therefore, for the predetermined adjacent region, a set of assumed data can be stored in the storage device as a part of the preview reference database.

In another aspect of the present disclosure, the second control unit is configured to store the set of assumed data together with identification information indicating that the road surface displacement-related value is the assumed road surface displacement-related value in the storage device as a part of the preview reference database when storing the set of assumed data in the storage device as a part of the preview reference database.

According to the above aspect, the set of assumed data together with identification information indicating that the road surface displacement-related value is the assumed road surface displacement-related value is stored in the storage device as a part of the preview reference database when storing the set of assumed data in the storage device as a part of the preview reference database.

Therefore, when the preview damping control is performed using the road surface displacement-related value and the position information in the preview reference database stored in the storage device, it can be determined by the identification information whether or not the road surface displacement-related value is the assumed road surface displacement-related value.

Further, in another aspect of the present disclosure, the second control unit is configured not to store the set of assumed data in the storage device when it is determined that a set of data in which the road surface displacement-related value calculated based on a road surface displacement-related information detected when the vehicle or other vehicles traveled and the position information are associated with each other for a position in the predetermined adjacent region has already been stored in the storage device.

According to the above aspect, the set of assumed data is not stored in the storage device when it is determined that a set of data in which the road surface displacement-related value calculated based on a road surface displacement-related information detected when the vehicle or other vehicles traveled and the position information are associated with each other for a position in the predetermined adjacent region has already been stored in the storage device.

Therefore, a set of data that is already stored in the storage device with a road surface displacement-related value calculated based on detected road surface displacement-related information and position information being associated with each other can be prevented from being overwritten by a set of assumed data to be stored.

Further, in another aspect of the present disclosure, the second control unit is configured to extract a low frequency component of the assumed road surface displacement-related value by an extraction process, and store a set of data of the assumed road surface displacement-related value after the extraction process and the corresponding position information associated with each other in the storage device as a part of the preview reference database.

In general, the higher a frequency of a road surface displacement-related value, the lower a flatness of a road surface, and the greater the possibility that an amount of difference between road surface displacement-related values at the road surface portions adjacent to each other is large. In other words, the higher a frequency of a road surface displacement-related value, the narrower a range of the road surface on which road surface displacement-related values can be assumed to be the same. However, a low frequency component of a road surface displacement-related value is the same over a relatively wide range of a road surface.

According to the above aspect, a low frequency component of the assumed road surface displacement-related value is extracted by an extraction process. Therefore, even in a situation where a road surface is low in flatness, it is possible to reduce the possibility that an unsprung displacement assumed for a predetermined adjacent region is significantly different from an actual unsprung displacement in that region as compared to where a low frequency component of the assumed road surface displacement-related value is not extracted. Thus, it is possible to reduce the possibility that the preview damping control is performed with an inappropriate control force due to a large difference between an assumed unsprung displacement and an actual unsprung displacement.

Further, in another aspect of the present disclosure, the second control unit is configured to variably set a size of the predetermined adjacent region in the direction crossing the traveling direction of the vehicle so that the lower a frequency of the component extracted by the extraction process, the larger the size of the predetermined adjacent region.

As explained later, a range in which a road surface displacement-related value can be assumed to be the same may be larger as a wavelength of the road surface displacement-related value is longer, and the wavelength of the road surface displacement-related value is larger as the frequency of the road surface displacement-related value is lower. Therefore, a size of the predetermined adjacent region in the direction across the traveling direction of the vehicle in which it is assumed that the road surface displacement-related values are the same may be increased as a frequency of a component extracted by the extraction process is lower.

According to the above aspect, the lower a frequency of the component extracted by the extraction process, the larger a size of the predetermined adjacent region in the direction across the traveling direction of the vehicle. Therefore, in a situation where a flatness of a road surface is high, the size of the predetermined adjacent region in the above direction can be increased, thereby increasing a range in which the road surface displacement-related values are assumed to be the same. On the contrary, in a situation where a flatness of a road surface is low, the size of the predetermined adjacent region in the above direction can be reduced, and it is possible to reduce the possibility that an road surface displacement-related value assumed for the predetermined adjacent region is significantly different from an actual road surface displacement-related value in the predetermined adjacent region.

Further, in another aspect of the present disclosure, the vehicle has a control force generator configured to generate a control force acting between the sprung and an unsprung, and the first control unit is configured to determine a predicted wheel passage position through which a wheel is predicted to pass, acquire a road surface displacement-related value or an assumed road surface displacement-related value at the predicted wheel passage position in the preview reference database by communication, calculate a target preview damping control force for reducing a vibration of the sprung when the wheel passes through the predicted wheel passage position based on the acquired road surface displacement-related value or the acquired assumed road force generator so that a control force generated by the control force generator when the wheel passes through the predicted wheel passage position becomes the target preview damping control force.

According to the above aspect, a predicted wheel passage position through which a wheel is predicted to pass is determined, and a road surface displacement-related value or an assumed road surface displacement-related value at the predicted wheel passage position in the preview reference database is acquired by communication. A target preview damping control force for reducing a vibration of the sprung when the wheel passes through the predicted wheel passage position is calculated based on the acquired road surface displacement-related value or the acquired assumed road surface displacement-related value. Further, the control force generator is controlled so that a control force generated by the control force generator when the wheel passes through the predicted wheel passage position becomes the target preview damping control force.

Therefore, even when a road surface displacement-related value at the predicted wheel passage position is an assumed road surface displacement-related value, a target preview damping control force can be calculated based on the assumed road surface displacement-related value, and the preview damping control can be performed based on the target preview damping control force.

Further, in one aspect of the present disclosure, the first control unit is configured to extract a low frequency component of an assumed road surface displacement-related value by an extraction process when the first control unit acquires the assumed road surface displacement-related value by communication, and calculate a target preview damping control force for reducing a vibration of the sprung when the wheel passes through the predicted wheel passage position based on the assumed road surface displacement-related value after the extraction process.

According to the above aspect, a low frequency component of an assumed road surface displacement-related value is extracted by an extraction process when the first control unit acquires the assumed road surface displacement-related value by communication. Therefore, even in a situation where a flatness of a road surface is low, as compared to where a low frequency component of the road surface displacement-related value is not extracted, it is possible to reduce the possibility that a road surface displacement-related value assumed for a predetermined adjacent region is significantly different from an actual road surface displacement-related value in that region. Thus, it is possible to reduce the possibility that the preview damping control is performed with an inappropriate control force due to a large difference between an assumed road surface displacement-related value and an actual road surface displacement-related value.

Further, in another aspect of the present disclosure, the first control unit is configured to variably set a size of the predetermined adjacent region in the direction crossing the traveling direction of the vehicle so that the lower a frequency of the component extracted by the extraction process, the larger the size of the predetermined adjacent region.

According to the above aspect, the lower a frequency of the component extracted by the extraction process, the larger a size of the predetermined adjacent region in the direction crossing the traveling direction of the vehicle. Therefore, in a situation where a flatness of the road surface is high, the size of the predetermined adjacent region in the above direction can be increased, thereby increasing a range in which the road surface displacement-related values are assumed to be the same. On the contrary, in a situation where a flatness of the road surface is low, the size of the predetermined adjacent region in the above direction can be reduced, and it is possible to reduce the possibility that a road surface displacement-related value assumed for the predetermined adjacent region is significantly different from an actual road surface displacement-related value in the predetermined adjacent region.

Further, in one aspect of the present disclosure, the first control unit is configured to reduce the target preview damping control force when it is determined that a road surface displacement-related value at the predicted wheel passage position acquired by communication is an assumed road surface displacement-related value.

Since the reliability of an assumed road surface displacement-related value is lower than the reliability of a road surface displacement-related value based on a detected value, the reliability of a target preview damping control force calculated based on an assumed road surface displacement-related value is lower than the reliability of a target preview damping control force calculated based on a road surface displacement-related value based on a detected value.

According to the above aspect, the target preview damping control force is reduced when it is determined that a road surface displacement-related value at the predicted wheel passage position acquired by communication is an assumed road surface displacement-related value. Therefore, as compared to where the target preview damping control force is not reduced even when a road surface displacement-related value is an assumed road surface displacement-related value, it is possible to reduce the possibility that an inappropriately large damping control force is generated.

Further, in another aspect of the present disclosure, the in-vehicle control device is configured to perform other damping control that calculates other target damping control force other than the target preview damping control force, and control the control force generator so that a control force generated by the control force generator when the wheel passes through the predicted wheel passage position becomes the other target damping control force, and the first control unit is configured to increase a control force generated based on the other target damping control force when it is determined that a road surface displacement-related value at the predicted wheel passage position acquired by communication is an assumed road surface displacement-related value.

According to the above aspect, other target damping control force other than the target preview damping control force is calculated, and other damping control is performed to control the control force generator so that a control force generated by the control force generator when the wheel passes through the predicted wheel passage position becomes the other target damping control force. Further, a control force generated based on the other target damping control force is increased when it is determined that a road surface displacement-related value at the predicted wheel passage position acquired by communication is an assumed road surface displacement-related value.

Therefore, as compared to where other damping control is not performed, a vibration of the sprung can be effectively reduced even when a road surface displacement-related value is an assumed road surface displacement-related value. In particular, when a control force generated based on the target preview damping control force is reduced in a situation where a road surface displacement-related value is an assumed road surface displacement-related value, a damping control force is supplemented with a control force of the other damping control, so that the risk of insufficient damping control force can be reduced.

Further, in another aspect of the present disclosure, the second control unit stores road surface section information in which a road surface of each road in the preview reference database is divided into a plurality of road surface sections in advance, and is configured to store position information that can identify a road surface section in the storage device as position information corresponding to a calculated road surface displacement-related value.

According to the above aspect, road surface section information in which a road surface of each road in the preview reference database is divided into a plurality of road surface sections in advance is stored, and position information that can identify a road surface section is stored in the storage device as position information corresponding to a calculated road surface displacement-related value.

Thus, the preview reference database including a set of data for each road surface section can be stored in the storage device. Therefore, as compared to where a set of data for each point where a road surface displacement-related information is detected and each point in an adjacent region is stored in the storage device as a part of the preview reference database, the number of data sets can be reduced and a storage capacity of the storage device can be reduced.

Further, the present disclosure provides a preview damping control method for a vehicle for reducing a vibration of a sprung of the vehicle using:

an in-vehicle control device including a road surface displacement-related information detection device that detects road surface displacement-related information related to a vertical displacement of at least one of a position of a wheel and a position in front of the wheel while the vehicle is traveling, and a first control unit that controls the road surface displacement-related information detection device, and a preview reference database control device including a storage device that stores a preview reference database and a second control unit that controls the storage device.

The damping force control method comprises:

a step of associating road surface displacement-related information detected by the road surface displacement-related information detection device with position information capable of identifying a position where the road surface displacement-related information was detected and transmitting the associated information to the second control unit, a step of calculating a road surface displacement-related value related to a vertical displacement of a road surface based on road surface displacement-related information transmitted from the vehicle or other vehicles, a step of storing a set of data of the calculated road surface displacement-related value and the corresponding position information associated with each other in the storage device as a part of the preview reference database, a step of performing preview damping control using the road surface displacement-related information and the position information in the preview reference database, and a step of assuming that a road surface displacement-related value in a predetermined adjacent region located in a direction crossing a traveling direction of the vehicle with respect to a point where the road surface displacement-related information was detected by the road surface displacement-related information detection device is the same as a road surface displacement-related value at the point in at least one of the step of storing the set of data in the storage device and the step of performing the preview damping control.

According to the above control method, as in the preview damping control apparatus, a vibration of the sprung of the vehicle can be reduced by pre-reading a road surface displacement-related value and corresponding position information in the preview reference database stored in the storage device and performing the preview damping control.

Further, according to the above control method, a set of data for a point where the road surface displacement-related information was detected and a predetermined adjacent region can be stored in the storage device. Therefore, it is possible to pre-read effective road surface displacement-related values and dampen a vibration of the sprung without requiring a large number of vehicles to travel on the same road at various lateral positions.

Other objects, other features and attendant advantages of the present disclosure will be readily understood from the description of the embodiments of the present disclosure described with reference to the following drawings.

BRIEF DESCRIPTION OF THE DRAWINGS

The present disclosure will now be described in detail with reference to the accompanying drawings.

DETAILED DESCRIPTION

First Embodiment

<Configuration>

Figure 1:
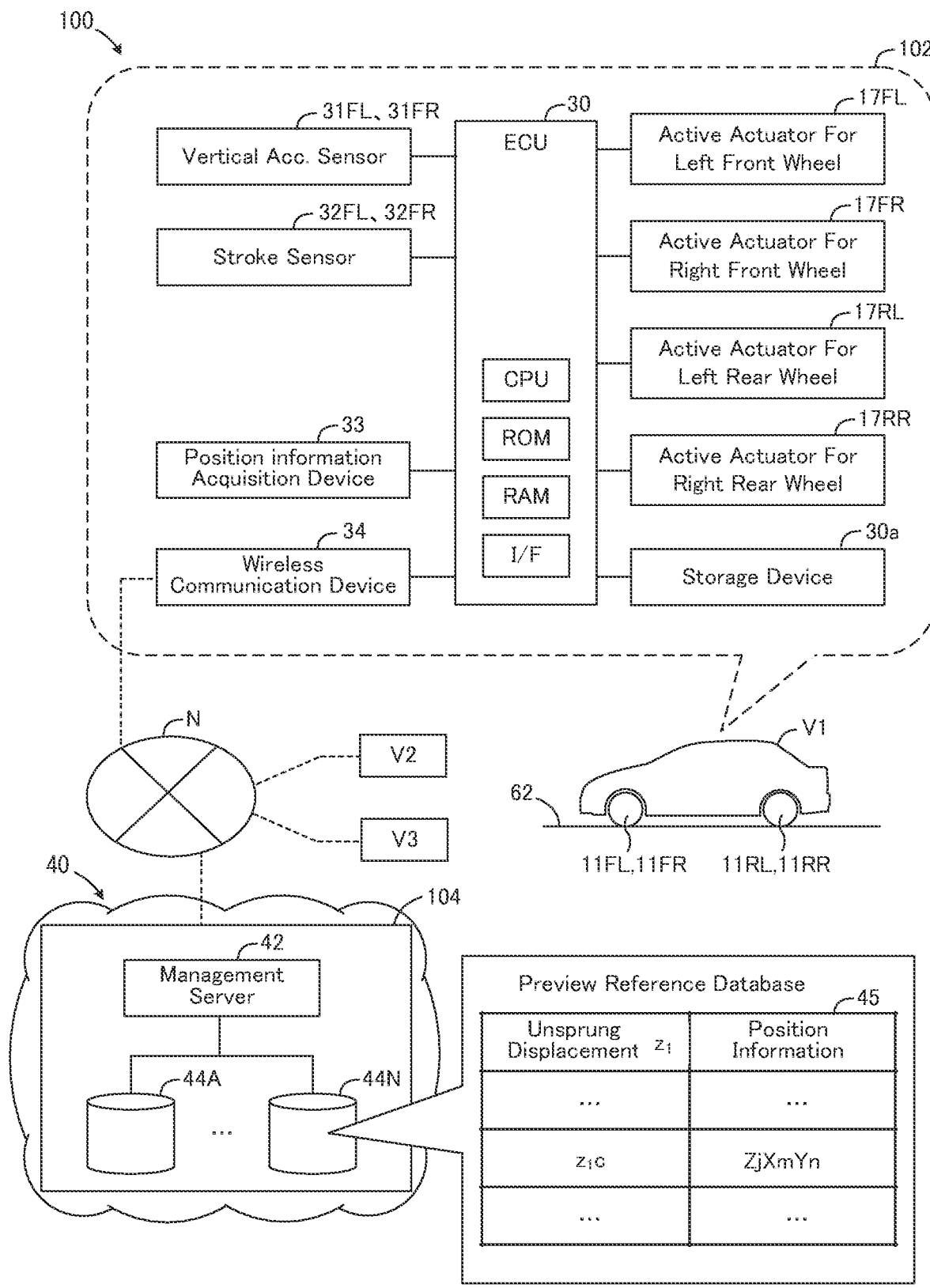
FIG. 1 is a schematic configuration diagram showing a preview damping control apparatus according to an embodiment.

In the first embodiment, a preview damping control apparatus 100 includes an in-vehicle device 102 mounted on a vehicle V1 and a preview reference database control device 104 installed outside the vehicle, as shown in FIG. 1.

The in-vehicle device 102 includes an ECU 30 that function as a first control unit, a storage device 30a, a position information acquisition device 33, and a wireless communication device 34. Further, the in-vehicle device 102 includes active actuators 17FL, 17FR, 17RL and 17RR provided corresponding to a left front wheel 11FL, a right front wheel 11FR, a left rear wheel 11RL and a right rear wheel 11RR of the vehicle V1, respectively. The left front wheel 11FL, the right front wheel 11FR, the left rear wheel 11RL, and the right rear wheel 11RR are referred to as a wheel 11 as necessary. The active actuators 17FL to 17RR function as a control force generator configured to generate a control force acting between a sprung and an unsprung, and are referred to as an active actuator 17 as necessary.

Although a control force that can be generated is limited, the control force generator may be an active stabilizer device, a shock absorber of a variable damping force type, or the like. Further, a suspension in which a wheel includes an in-wheel motor, that is, a suspension in which a front-rear force of the wheel is converted into a vertical force using geometry of the suspension, AVS (Adaptive Variable Suspension System), etc may be used as a suspension capable of generating a control force.

Figure 2:
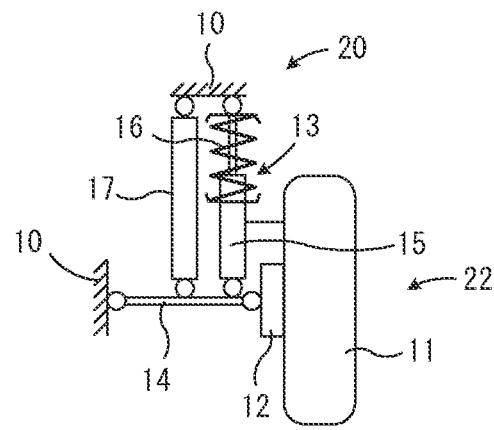
FIG. 2 is a diagram showing a suspension including an active actuator.

As shown in FIG. 2, each wheel 11 of the vehicle V1 is rotatably supported by a wheel support member 12. The vehicle V1 is provided with a suspension 13 corresponding to each wheel 11, and the suspension 13 may be an independent suspension type suspension. Each suspension 13 suspends corresponding wheels from a vehicle body 10, and includes a suspension arm 14, a shock absorber 15, and a suspension spring 16.

The suspension arm 14 connects the wheel support member 12 to the vehicle body 10. Although only one suspension arm 14 is shown for one suspension 13 in FIG. 2, a plurality of suspension arms 14 may be provided for one suspension 13.

In FIG. 2, the shock absorber 15 and the suspension spring 16 are arranged between the vehicle body 10 and the suspension arm 14, but may be arranged between the vehicle body 10 and the wheel support member 12. The suspension spring 16 may be a spring other than a coil spring.

As is well known, among the members such as the vehicle body 10 of the vehicle V1 and the shock absorber 15 and the like, the portions of the members on the vehicle body 10 side with respect to the suspension spring 16 is a sprung 20. On the other hand, among the members such as the wheel 11 of the vehicle V1 and the shock absorber 15, the portions of the members on the wheel 11 side with respect to the suspension spring 16 is an unsprung 22.

Further, the active actuator 17 is arranged between the vehicle body 10 and the suspension arm 14 in parallel with the shock absorber 15 and the suspension spring 16. The active actuator 17 is configured to generate a control force acting between the sprung 20 and the unsprung 22, and the control force is controlled by the active actuator 17 being controlled by the ECU 30.

The ECU 30 includes a microcomputer, and the microcomputer includes a CPU, a ROM, a RAM, an interface (I/F), and the like. The CPU realizes various functions by executing instructions (programs, routines) stored in the ROM.

The ECU 30 is connected to a non-volatile storage device 30a capable of reading and writing information. The ECU 30 can store information in the storage device 30a and read out information stored in the storage device 30a. The storage device 30a is a hard disk drive in the present embodiment, but is not limited to the hard disk drive, and may be a well-known storage device or storage medium capable of reading and writing information.

The in-vehicle device 102 is provided with sprung vertical acceleration sensors 31FL, 31FR and stroke sensors 32FL, 32FR corresponding to the left and right front wheels 11FL, 11FR. These vertical acceleration sensors and stroke sensors are in-vehicle sensors and are connected to the ECU 30. These vertical acceleration sensors and stroke sensors function as a road surface displacement-related information detection device that detects road surface displacement-related information related to a vertical displacement of a road surface at positions of the left and right front wheels at predetermined time intervals while the vehicle V1 is traveling.

The "road surface displacement-related information" may be at least one of an unsprung displacement representing a vertical displacement of the unsprung of the vehicle, an unsprung velocity which is a time derivative value of the unsprung displacement, a road surface displacement representing a vertical displacement of a road surface, a road surface velocity which is a time derivative of the road surface displacement, and a physical quantity that can be a basis of calculating these values. Further, the "road surface displacement-related value" described later may be one of the unsprung displacement representing a vertical displacement of the unsprung of the vehicle and a road surface displacement representing a vertical displacement of a road surface. Therefore, the "road surface displacement-related information" and the "road surface displacement-related value" are specifically information and values related to road surface unevenness, non-flatness, lateral inclination, longitudinal inclination and the like.

The road surface displacement-related information detection device that detects road surface displacement-related information at positions of the left and right front wheels may be a vertical acceleration sensor that detects a vertical acceleration of the unsprung 22. Further, a laser sensor may be adopted as a road surface displacement-related information detection device that detects road surface displacement-related information at positions in front of the left and right front wheels.

The vertical acceleration sensors 31FL and 31FR are provided at portions corresponding to the left and right front wheels, respectively of the vehicle body 10 (the sprung). The vertical acceleration sensors 31FL and 31FR each detect a vertical acceleration (sprung acceleration $ddz_2fl$ and $ddz_2fr$) of the corresponding portions of the sprung 20 and output a signal representing the vertical acceleration to the ECU 30. The vertical acceleration sensors 31FL and 31FR are referred to as "vertical acceleration sensors 31" when it is not necessary to distinguish them. Similarly, the sprung acceleration $ddz_2fl$ and $ddz_2fr$ are referred to as "sprung acceleration $ddz_2$".

The stroke sensors 32FL and 32FR are provided on the left and right front wheel suspensions 13, respectively. The stroke sensors 32FL and 32FR detect vertical strokes Hfl and Hfr of the corresponding suspension 13, respectively, and each output a signal indicating the vertical stroke to the ECU 30. The strokes Hfl and Hfr are vertical relative displacements between the vehicle body 10 (sprung) corresponding to the positions of the left and right front wheels and the corresponding wheel support member 12 (unsprung), respectively. The stroke sensors 32FL and 32FR are referred to as "a stroke sensor 32" when it is not necessary to distinguish them. Similarly, strokes Hfl and Hfr are referred to as "a stroke H".

Further, as shown in FIG. 1, the ECU 30 is connected to the position information acquisition device 33 and the wireless communication device 34.

The position information acquisition device 33 includes a GNSS (Global Navigation Satellite System) receiver and a map database. The GNSS receiver receives a "signal from an artificial satellite (for example, a GNSS signal)" for detecting a current time position (current position) of the vehicle V1. Road map information and the like are stored in the map database. The position information acquisition device 33 is a device that acquires a current position (for example, latitude and longitude) of the vehicle V1 based on the GNSS signal, and is, for example, a navigation device.

The wireless communication device 34 is a wireless communication terminal for communicating with a preview reference database control device 104 provided in a cloud 40 via a network N. As shown in FIG. 1, other vehicles V2 and V3 also have the same in-vehicle devices as the in-vehicle device 102 of the vehicle V1, and their wireless communication devices can also communicate with the preview reference database control device 104 via the network N. In the present embodiment shown in FIG. 1, there are two other vehicles, V2 and V3, but the number of the other vehicles may be a large number more than three.

The control device 104 includes a management server 42 connected to the network and a plurality of storage devices 44A to 44N, and the management server 42 functions as a second control unit. The storage devices 44A to 44N are referred to as "a storage device 44" when it is not necessary to distinguish between them. The storage device 44 functions as a storage device outside the vehicle of the preview damping control apparatus 100.

The management server 42 may be an ECU including a CPU, a ROM, a RAM, an interface (I/F), and the like. The management server 42 searches and reads a data stored in the storage device 44, and writes a data to the storage device 44.

The storage device 44 stores a preview reference database (hereinafter, simply referred to as "database") 45, which is a map for preview damping control. In the database 45, an unsprung displacement $z_1$ calculated based on road surface displacement-related information detected when the vehicle V1 or another vehicle V2 or V3 actually travels is registered in association with position information that can specify a position where the road surface displacement-related information was detected. Therefore, the database 45 is data of a combination of an unsprung displacement $z_1$ calculated based on road surface displacement-related information and position information at which a position where the road surface displacement-related information was detected can be specified. The calculation of an unsprung displacement $z_1$ and position information will be described in detail later.

Figure 3:
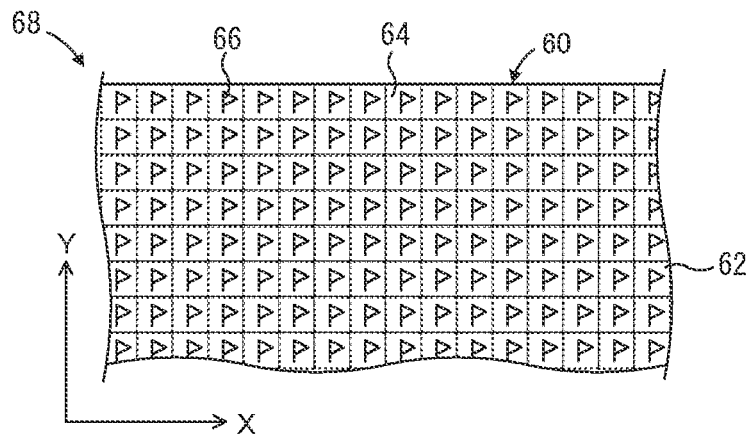
FIG. 3 is a diagram showing an example of road surface section information stored in a preview reference database.

In the present embodiment, the management server 42 stores the information of each road, and as shown in FIG. 3, stores road surface section information 68 in which a road surface 62 of each road 60 is divided into a plurality of road surface sections 64 in advance as map information indicating road surface areas of each road in the database 45. X direction may be, for example, the north direction of the grovel direction, and Y direction may be a direction perpendicular to the X direction. The positions of the road surface sections 64 in the X direction and the Y direction are represented by indexes Xm (m=1, 2, 3 . . . ) and indexes Yn (n=1, 2, 3 . . . ), respectively.

In FIG. 3, a strip-shaped region shown by the solid line is a region corresponding to the road 60, and the dotted line is a line indicating the road surface sections 64. A size of the road surface sections 64 affects resolution of the database (map) 45. That is, the larger the size of the road surface sections 64, the lower the resolution of the database 45, and conversely, the smaller the size of the road surface sections 64, the higher the resolution of the database 45. The size and shape of each road surface section 64 may be determined according to a size and shape of a ground contact area of a tire of the wheel and ease of the control, and the shape of each road surface section of the present embodiment is a square having a side length of a constant value from 50 to 150 mm, typically 100 mm.

In the initial state of the database 45, the unsprung displacement $z_1$ of each road surface section 64 is assumed to be an initial value (for example, 0), and an assumption flag 66 of each road surface section 64 is set to ON. A fact that the assumption flag 66 is ON means that an unsprung displacement stored in the storage device 44 for the corresponding road surface section 64 is an initial value or an assumed unsprung displacement. The assumed unsprung displacement will be described later. Therefore, the assumption flag 66 functions as identification information indicating whether or not the unsprung displacement stored in the storage device 44 is an initial value or an assumed unsprung displacement.

In the present embodiment, the position information stored in the storage device 44 by the management server 42 is the position information that can identify the road surface section 64. As shown in FIG. 1, the position information associated with, for example, the unsprung displacement $z_1 c$ registered in the database 45 may be expressed as "ZjXmYn" (Zj is an identification number of each road 60 and j is a positive integer) that specifies the road surface section 64.

Further, the ECU 30 is connected to each of the left front wheel active actuator 17FL, the right front wheel active actuator 17FR, the left rear wheel active actuator 17RL, and the right rear wheel active actuator 17RR via a drive circuit (not shown).

The ECU 30 calculates a target control force Fct for reducing a vibration of the sprung of each wheel 11 based on an unsprung displacement $z_1$ at the predicted wheel passage position described later of each wheel 11, and controls the active actuator 17 so that a control force Fc generated by the active actuator 17 becomes the target control force Fct when each wheel 11 passes through the predicted wheel passage position.

<Outline of Preview Damping Control>

An outline of the basic preview damping control performed by the damping control apparatus 20 will next be described.

Although not shown in the figure, a mass of the sprung is represented as $m_2$, and an unsprung displacement, that is, a displacement in the vertical direction of the unsprung is represented as $z_1$. A displacement of the sprung, that is, a displacement in the vertical direction of the sprung at the position of each wheel 11 is represented as $z_2$. A spring constant (equivalent spring constant) of a spring (the suspension spring 16 and the like) of the suspension 13 is represented as K, and a damping coefficient (equivalent damping coefficient) of a damper (the shock absorber 15 and the like) of the suspension 13 is represented as C. A control force generated by the actuator 17 is represented as Fc.

Time derivative values of z1 and z2 are represented as dz1 and dz2, respectively. Second order time derivative values of z1 and z2 are represented as ddz1 and ddz2, respectively. The values of z1 and z2 become positive when the respective parts move upward. The forces generated by the spring, the damper, and the actuator 17 and the like have positive signs when direction of the forces generated by them is upward.

A motion equation for a vertical movement of the sprung 20 of the vehicle V1 is expressed by the following equation (1).

$$m_2 \cdot ddz_2 = C \cdot (dz_1 - dz_2) + K \cdot (z_1 - z_2) - Fc \tag{1}$$

It is assumed that the damping coefficient C in the equation (1) is constant. However, since an actual damping coefficient changes according to a stroke speed of the suspension 13, for example, it may be variably set according to a time derivative value of the stroke H.

When a vibration of the sprung is completely canceled (eliminated) by the control force Fc (in other words, when the acceleration $ddz_2$, the velocity $dz_2$, and the displacement $z_2$ of the sprung are made to be zero), the control force Fc is expressed as the following equation (2).

$$Fc = C \cdot dz_1 + K \cdot z_1 \tag{2}$$

Therefore, the control force Fc that reduces the vibration of the sprung can be expressed by the following equation (3) with a control gain as $\alpha$. The control gain $\alpha$ is an arbitrary constant greater than 0 and less than or equal to 1.

$$Fc = \alpha \cdot (C \cdot dz_1 + K \cdot z_1) \tag{3}$$

By applying the equation (3) to the equation (1), the equation (1) can be expressed as the following equation (4).

$$m_2 \cdot ddz_2 = C \cdot (dz_1 - dz_2) + K \cdot (z_1 - z_2) - \alpha \cdot (C \cdot dz_1 + K \cdot z_1) \tag{4}$$

When a Laplace transform is performed for the equation (4), and then the result is deformed, the equation (4) can be expressed as the following equation (5). In the equation (5), "s" represents a Laplace operator.

$$\frac{z_2}{z_1} = \frac{(1-\alpha)(Cs+K)}{m_2 s^2 + Cs + K} \tag{5}$$

As understood from the equation (5), a magnitude of the transfer function varies depending on $\alpha$, and becomes minimum when $\alpha$ is equal to 1. Therefore, a target control force Fct can be expressed by the following equation (6) corresponding to the equation (3). A gain $\beta_1$ in the equation (6) corresponds to $\alpha Cs$, and a gain $\beta_2$ corresponds to $\alpha K$.

$$Fct = \beta_1 \cdot dz_1 + \beta_2 \cdot z_1 \tag{6}$$

Therefore, the ECU 30 of the in-vehicle device 102 acquires in advance (previews) an unsprung displacement $z_1$ and its time derivative $dz_1$ at a position where the wheel 11 passes through later (predicted wheel passage position) by communication from the database control device 104, and applies the acquired unsprung displacement $z_1$ to the equation (6) to calculate a target control force Fct. Then, the ECU 30 make the actuator 17 generate a control force Fc corresponding to the target control force Fct at a timing when the wheel 11 passes through the predicted wheel passage position (that is, at a timing when the unsprung displacement $z_1$ applied to the equation (6) occurs). In this way, it is possible to reduce a vibration of the sprung that occurs when the wheel 11 passes through the predicted wheel passage position.

The above is the damping control of the sprung, and the damping control of the sprung based on an unsprung displacement $z_1$ acquired in advance is the preview damping control in this embodiment and other embodiments described later.

It should be noted that, in the above explanation, a mass of the unsprung and an elastic deformation of a tire are ignored so that a road surface vertical displacement $z_0$ is deemed to be substantially the same as the unsprung displacement $z_1$. Therefore, the preview damping control can be carried out using a vertical displacement $z_0$ of a road surface in place of the unsprung displacement $z_1$.

The following equation (7) is an equation for simply calculating a target control force Fct by omitting the derivative term ($\beta_1 \cdot dz_1$) of the above equation (6). Even when a target control force Fct is calculated according to the equation (7), a control force ($= \beta_2 \cdot z_1$) for reducing a vibration of the sprung is generated by the actuator 17, so that the vibration of the sprung can be reduced as compared to where this control force is not generated.

$$Fct = \beta_2 \cdot z_1 \tag{7}$$

<Database Making Routine in the First Embodiment>

Figure 5:
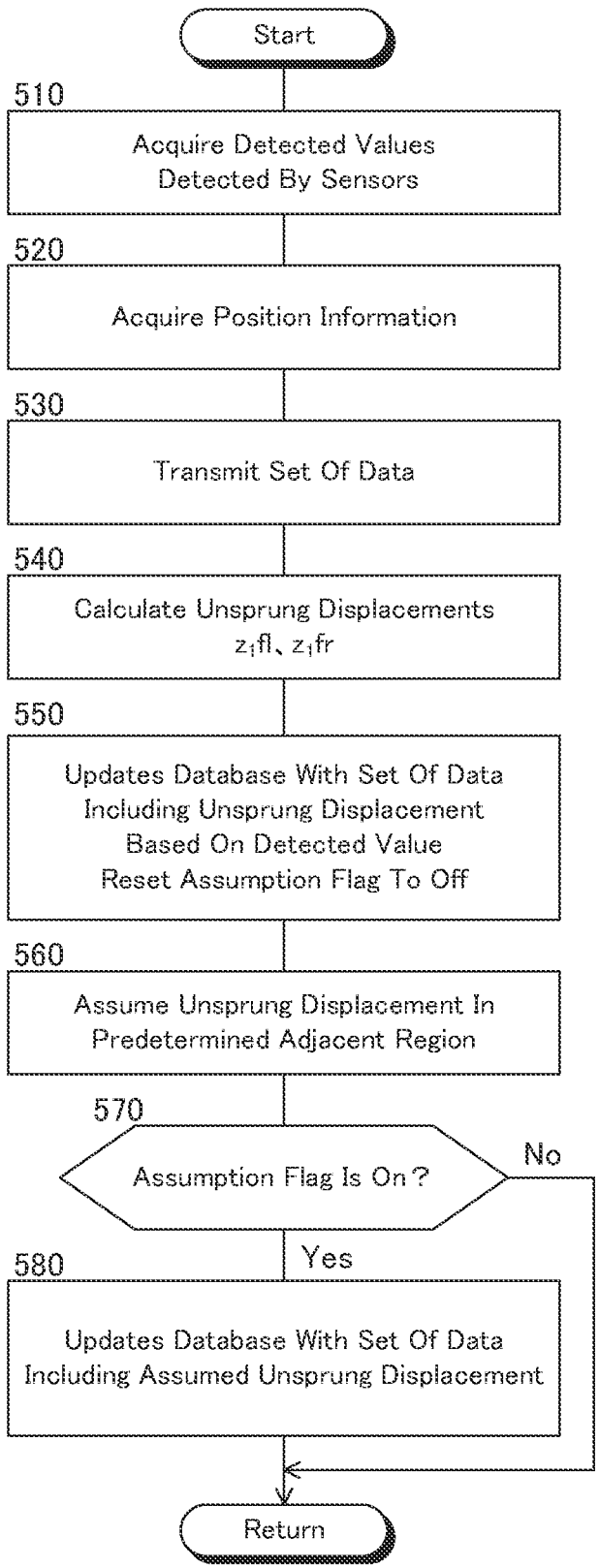
FIG. 5 is a flowchart showing a preview reference database generation routine of the first embodiment.

In the first embodiment, the database is made by executing the database making routine shown in the flowchart of FIG. 5 at predetermined elapsed time intervals. Steps 510 to 530 are executed by the CPU of the ECU 30, and steps 530 to 580 are executed by the CPU of the management server 42. Further, steps 540-580 may be performed for unsprung displacements $z_1fl$ and $z_1fr$, steps 540-580 may be performed for an unsprung displacement $z_1fl$, and then steps 540-580 may be performed for an unsprung displacement $z_1fr$.

First, in step 510, the CPU acquires sprung accelerations $ddz_2fl$ and $ddz_2fr$ detected by the vertical acceleration sensors 31FL and 31FR, respectively and strokes Hfl and Hfr detected by the stroke sensors 32FL and 32FR, respectively. These pieces of information are road surface displacement-related information related to vertical displacements of a road surface at the positions of the left and right front wheels.

In step 520, the CPU acquires a current position and a traveling direction based on a traveling path of the vehicle V1 from the position information acquisition device 33, and, based on them, acquires position information that can specify a position (a position of the wheel 11) at which the road surface displacement-related information was acquired. In this case, the position information acquisition device 33 specifies the current position and the traveling direction based on information on automatic driving, information on GNSS, and the like. Since various existing methods may be adopted for specifying the current position and the traveling direction, detailed description of specifying the current position and the traveling direction will be omitted. The current position and the traveling direction of the vehicle V1 are position information that can specify a position at which the road surface displacement-related information was acquired.

In step 530, the CPU of the ECU 30 transmits to the management server 42 via the wireless communication device 34 and the network a set of data in which the road surface displacement-related information and the position information acquired in steps 510 and 520 are associated. The CPU of the management server 42 stores the received information in a storage device (not shown in FIG. 1).

The data set may be transmitted by the CPU of the ECU 30 sequentially every time steps 510 and 520 are completed, but the information acquired in steps 510 and 520 may temporarily be stored in the storage device 30a or the like, and a series of temporarily stored information may be transmitted to the management server 42 at predetermined time intervals.

In step 540, the CPU calculates unsprung displacements $z_1fl$ and $z_1fr$ corresponding to the left and right front wheels by offline data processing based on the sprung accelerations $ddz_2fl$ and $ddz_2fr$ and the strokes Hfl and Hfr received in step 530, respectively. Each unsprung displacement may be calculated in any manner known in the art, for example using an offline filter and an ideal integral, as a difference between the second-order integral of the unsprung displacement and the stroke.

Notably, unsprung displacements $z_1$ may be calculated by integrating unsprung vertical accelerations detected by the unsprung vertical acceleration sensors provided corresponding to the left and right front wheels in the second order. Further, unsprung displacements $z_1$ may be calculated by using an observer known in the art based on at least one of the vertical acceleration of the sprung, a suspension stroke, and a vertical acceleration of the unsprung at each wheel position. Further, unsprung displacements $z_1$ may be calculated based on vertical displacements of a road surface at positions in front of the left and right front wheels detected by the laser sensor.

In particular, in this embodiment, an unsprung displacement $z_1$ is calculated for each road surface section 64. The calculation procedure of an unsprung displacement $z_1$ for the road surface section will be described with reference to FIG. 4.

Figure 4:
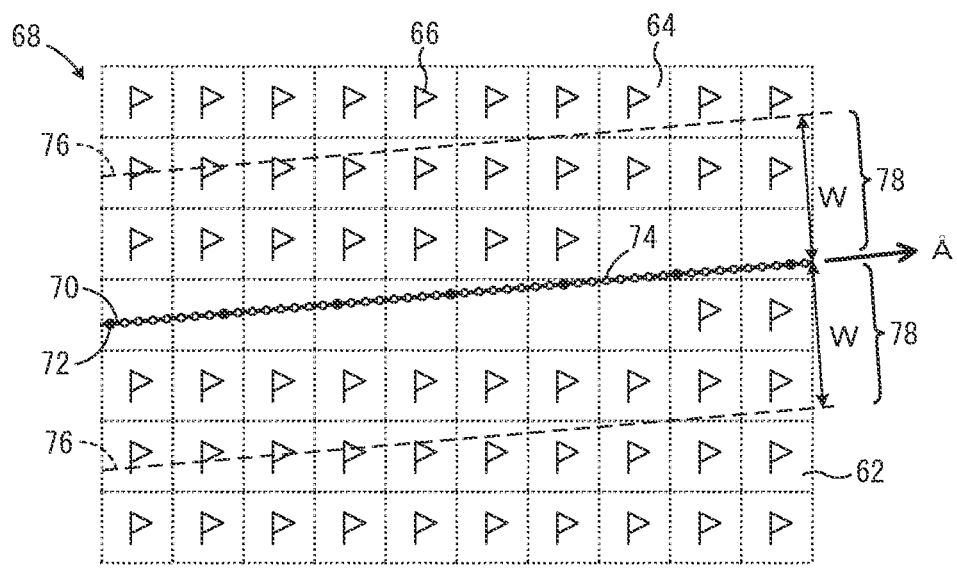
FIG. 4 is a figure which shows a procedure for assuming that an unsprung displacement of a road surface section in predetermined adjacent regions adjacent to a specified road surface section is the same as the unsprung displacement of the specified road surface section in the first embodiment.

In FIG. 4, the thick solid line 70 shows a straight line corresponding to an example of a movement locus of a center (not shown) of a ground contact region of a tire of the wheel 11. The arrow A indicates a moving direction of the wheel 11, and for convenience of explanation, it is assumed that the moving direction of the wheel 11 is the same as a traveling direction of the vehicle V1.

The black circle 72 on the thick solid line 70 indicates a point where a detected value is detected by a sensor such as the sprung vertical acceleration sensor 31FL, and an unsprung displacement based on the detected value is calculated as an unsprung displacement of a road surface section to which these points belong. The position of the black circle 72 in the road surface section information 68 indicating a road surface area in the database 45 may be determined by synchronizing the detected value included in the set of data received in step 530 with the position of the wheel 11 determined based on the position of the vehicle V1 and the direction of traveling.

The detected value of each sensor is acquired at a frequency corresponding to a sampling frequency of the sensor. Since the sampling frequency is constant, a distance between the points where the detected values are acquired (that is, a distance between the black circles 72 in FIG. 4) increases as the vehicle speed Vv1 increases. For example, assuming that the sampling frequency is 100 Hz and the vehicle speed is 100 km/h, the distance between the points where the detected values are acquired is about 278 mm, which is larger than the side and diagonal lengths of the road surface section 64.

Therefore, the number of black circles 72 along the moving direction of the wheels is smaller than the number of road surface sections 64 along the moving direction of the wheels. Therefore, the CPU of the management server 42 performs resampling to complement the unsprung displacement for a region between two points corresponding to two unsprung displacements calculated one after the other based on the detected values, that is, a region between two black circles 72 adjacent to each other. That is, the detected values included in the set of data received in step 530 are resampled and complementary unsprung displacements are calculated based on the resampled detected values so that there are estimated unsprung displacements between the two black circles 72, for example every 10 mm. The white circles 74 in FIG. 4 each indicate a point corresponding to the complementary unsprung displacement.

Resampling of a detected value may be performed by any method known in the art. Description of resampling a detected value will be omitted.

Further, the CPU of the management server 42 calculates an average value of the unsprung displacements or an average value of the unsprung displacements based on the complementary unsprung displacements and the detected values belonging to each road surface section 64 as an unsprung displacement of the road surface section. Thus, unsprung displacements based on the detected values are acquired for all the road surface sections 64 through which the thick solid line 70 passes in FIG. 4.

In step 550, the CPU identifies the road surface section corresponding to the position where the road surface displacement-related information was acquired based on the position information received in step 530. Further, the CPU stores a set of data in which the specified road surface section and the unsprung displacement calculated in step 540 (the unsprung displacement based on the detected value) are associated with each other in the storage device 44 as a part of the database. That is, the CPU updates the database with the unsprung displacement based on the detected value for the specified road surface section.

The CPU switches an assumption flag OFF when the assumption flag of the specified road surface section is ON. Further, when the unsprung displacement based on the detected value is already stored for the specified road surface section, the unsprung displacement calculated in step 540 may be stored by overwriting, or an average value of the already stored unsprung displacement and the calculated unsprung displacement may be stored.

In step 560, the CPU assumes that unsprung displacements of the road surface sections in predetermined adjacent regions adjacent to the road surface section identified in step 550 are the same as the unsprung displacement of the identified road surface section. As a result, unsprung displacements of the road surface sections in the predetermined adjacent regions are determined to be an assumed unsprung displacement calculated based on the unsprung displacement based on the detected value.

For example, as shown in FIG. 4, the CPU moves the black circles 72 and the white circles 74 on the thick solid line 70 specified as described above by a predetermined amount in a direction perpendicular to the thick solid line on both sides of the thick solid line 70 to copy them. In FIG. 4, the broken lines 76 indicate positions where the thick solid line 70 is copied. Unsprung displacements based on detected values and complementary unsprung displacements corresponding to the copied black circles 72c and white circles 74c, respectively are the same as unsprung displacements based on detected values and complementary unsprung displacements corresponding to the uncopied black circle 72 and white circle 74, respectively. The direction of movement for copying may be any direction that crosses the traveling direction of the vehicle V1 and does not have to be a direction perpendicular to the thick solid line 70.

Further, the CPU calculates an assumed unsprung displacement for each road surface section 64 based on the copied complementary unsprung displacements and the copied unsprung displacements based on detected values in the same manner as the above-mentioned unsprung displacement calculation performed for the black circles 72 and white circles 74 on the thick solid line 70. Therefore, for road surface sections which are adjacent to the road surface sections 64 through which the wheel passes, and through which the wheel do not pass, assumed unsprung displacements are acquired based on unsprung displacements based on detected values of the road surface sections 64 through which the wheels pass.

In the present embodiment, adjacency is the adjacency in the direction perpendicular to the traveling direction of the vehicle V1, but the adjacent direction may be a direction that crosses a traveling direction of the vehicle V1, and may be, for example, a direction perpendicular to a longitudinal direction of the vehicle V1 or a direction perpendicular to a lane. Further, the width W of the predetermined adjacent regions 78 in the direction crossing the traveling direction of the vehicle V1 is set to a range larger than a width of a tire (not shown) of the wheel 11 and not exceeding a lane. Further, the widths W on both sides of the thick solid line 70 may have different values.

Copying of unsprung displacements based on the detected values and complementary unsprung displacements may be performed a plurality of times as needed on both sides of the thick solid line 70 such that the assumed unsprung displacements are calculated for all road sections 64 in a predetermined adjacent region, especially when the width W is large.

As described above, the higher a frequency of the unsprung displacement, the lower a flatness of a road surface, and the greater the possibility that an amount of difference between the unsprung displacements of the road surface sections adjacent to each other is large. In other words, the higher the frequency of the unsprung displacement, the narrower a range of the road surface on which unsprung displacements can be assumed to be the same. Therefore, in step 560, a process of extracting a low frequency component of the unsprung displacement of a predetermined adjacent region, for example, a low-pass filtering process or a moving averaging process may be performed, and the unsprung displacement after the extraction process may be set to an assumed unsprung displacement $z_1ai$.

According to the low frequency component extraction process, it is possible to reduce the possibility that an unsprung displacement assumed for a road surface section in a predetermined adjacent region is significantly different from an actual unsprung displacement of the road surface section even in a situation where a flatness of the road surface is low as compared to where the low frequency component extraction process is not performed. Therefore, it is possible to reduce the possibility that the preview damping control is performed with an inappropriate control force due to a large difference between an assumed unsprung displacement and an actual unsprung displacement.

Further, a range in which the unsprung displacement can be assumed to be the same may be larger as a wavelength of the unsprung displacement is longer, and the wavelength of the unsprung displacement is larger as a frequency of the unsprung displacement is lower. Therefore, a width W of the adjacent region where it is assumed that the sprung displacements are the same may be changed depending on a frequency of the component extracted by the extraction process, for example, a cutoff frequency of the low-pass filtering process or a length of an averaging period in the moving averaging process.

For example, when a vehicle speed Vv1 is 36 km/h, one wavelength of an unsprung displacement having a frequency of 1 Hz is 10 m. Assuming that one tenth range of the unsprung displacement of one wavelength (there is no special basis for this range) has the same value, as for the width W of the adjacent region 78 where it is assumed that the unsprung displacements are the same, a width of ±0.5 m, that is, a width of 0.5 m on both sides of a predicted wheel passage position is effective. It is to be noted that + and − mean the lateral outside of the vehicle and the lateral inside of the vehicle with respect to the wheel, respectively.

Further, when a vehicle speed Vv1 is 36 km/h, one wavelength of an unsprung displacement having a frequency of 2 Hz is 5 m. As for the width W of the adjacent region 78 where it is assumed that the unsprung displacements are the same, a width of ±0.25 m, that is, a width of 0.25 m on both sides of the predicted wheel passage position is effective. Therefore, a width W of the adjacent region 78 where it is assumed that the sprung displacements are the same, may be variably set so as to increase as a frequency of a component extracted by the extraction process decreases. For example, the width W may be variably set so that the lower the cutoff frequency of the low-pass filtering process or the longer the average period of the moving averaging process, the larger the width W.

According to the variable setting of the width W of the adjacent region 78 described above, in a situation where a flatness of a road surface is high, the width W of the adjacent region 78 can be increased, thereby increasing the range in which the unsprung displacements are assumed to be the same. On the contrary, in a situation where a flatness of a road surface is low, the width W of the adjacent region 78 can be reduced, and it is possible to reduce the possibility that an unsprung displacement assumed for a road surface section in a predetermined adjacent region is significantly different from an actual unsprung displacement of the road surface section.

In step 570, the CPU sequentially determines whether or not the assumption flag is on for each road surface section in the predetermined adjacent region. Further, when the CPU makes a negative determination in each determination, that is, it determines that a set of data including the unsprung displacement based on the detected value is already stored, it temporarily terminates the control by the routine shown in FIG. 5 without storing the set of data.

On the contrary, when the CPU makes an affirmative determination, it stores a set of data in which the unsprung displacement (assumed unsprung displacement) assumed to be the same in step 580 and the road surface section are associated with each other in the storage device 44 as a part of the database. That is, the CPU updates the database with the assumed sprung displacement for the road surface section in the predetermined adjacent region.

<Preview Damping Control Routine in the First Embodiment>

Figure 6:
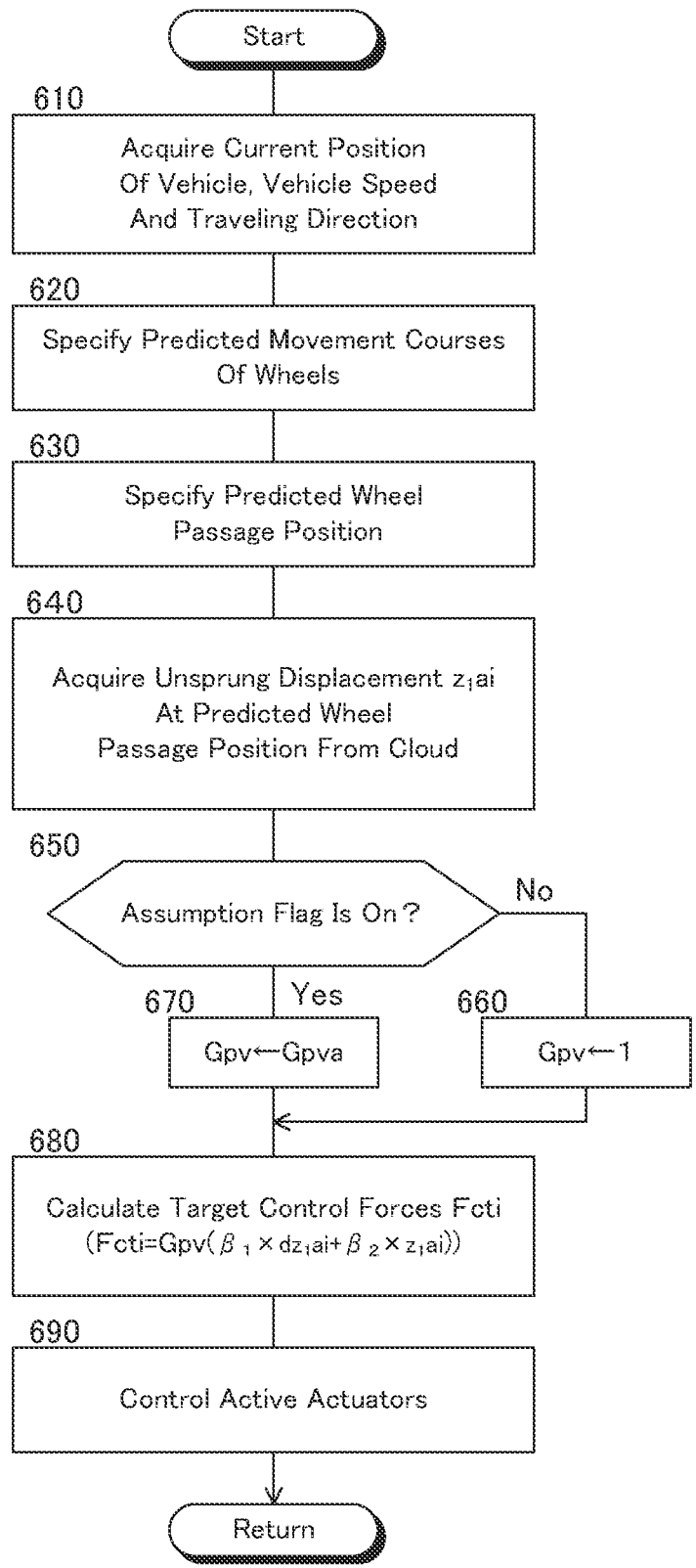
FIG. 6 is a flowchart showing a preview damping control routine of the first embodiment.

In the first embodiment, the preview damping control is executed by executing the damping control routine shown in the flowchart of FIG. 6 at predetermined elapsed time by the CPU of the ECU 30. The preview damping control may be executed for the positions of the left front wheel, the right front wheel, the left rear wheel, and the right rear wheel in this order, for example.

First, in step 610, the CPU acquires history information regarding the position of the vehicle V1 from the position information acquisition device 33, and acquires a current position of each wheel 11, a vehicle speed Vv1, and a traveling direction Td of the vehicle V1 based on the history information.

The ROM of the ECU 30 stores a positional relationship between the mounting position of the GNSS receiver and the position of each wheel 11 in the vehicle V1. The current position of the vehicle V1 acquired from the position information acquisition device 33 is a mounting position of the GNSS receiver, and the CPU determines the position of each wheel 11 based on the current position of the vehicle V1, the traveling direction Td of the vehicle V1, and the positional relationship of each wheel 11. Further, a GNSS signal received by the position information acquisition device 33 includes information on a moving speed of the vehicle V1, and the CPU acquires a vehicle speed Vv1 based on the GNSS signal.

In step 620, the CPU specifies predicted movement paths of the left and right front wheels and the left and right rear wheels based on a current position of each wheel 11, the traveling direction Td of the vehicle V1, and the above positional relationship. The predicted movement paths of the front and rear wheels are paths on which the front wheels 11F and the rear wheels 11R are predicted to move in the future, respectively.

In step 630, the CPU specifies predicted passage positions of the left and right front wheels and predicted passage positions of the left and right rear wheels after a predetermined time based on the predicted movement paths of the left and right front wheels and the left and right rear wheels and the vehicle speed V1.

In step 640, the CPU acquires unsprung displacements $z_1 ai$ (i=fl, fr, rl and rr) of the road surface sections 64 corresponding to the predicted passage positions of the left front wheel, right front wheel, left rear wheel and right rear wheel from the database 45 of the cloud 40.

The unsprung displacements z1ai may be acquired sequentially for each control cycle, or the unsprung displacements z1ai of the road surface sections 64 corresponding to a series of predicted wheel passage positions may be collectively acquired for each wheel, and may be stored in the RAM of the ECU 30.

In step 650, the CPU determines whether or not the assumption flag 66 of the road surface section 64 corresponding to the predicted wheel passage position is on. Further, when the CPU makes a negative determination, that is, determines that the unsprung displacement of the road surface section 64 corresponding to the predicted wheel passage position is an unsprung displacement based on a detected value, in step 660, a gain Gpv of the preview damping control is set to 1 that is a standard value. On the other hand, when the CPU makes an affirmative determination, in step 670, the gain Gpv of the preview damping control is set to a positive value Gpva, for example 0.8 which is smaller than the standard value.

When feedback damping control for reducing a vibration of the sprung is performed in addition to the preview damping control, a gain of the feedback damping control may be increased without reducing the gain Gpv of the preview damping control in step 670. Further, in step 670, the gain Gpv of the preview damping control may be reduced and the gain of the feedback damping control may be increased. In other words, in a vehicle in which damping control other than the preview damping control is also performed, the other damping control amount may be increased without reducing the preview damping control amount, or the preview damping control amount may be reduced and the other damping control amount may be increased.

The other damping control is not limited to the feedback damping control. For example, the other damping control may be a control in which road surface displacement-related information of a position in front of the wheel is acquired by a preview sensor such as a laser sensor, and a control force is controlled based on a road surface displacement-related value based on the road surface displacement-related information.

In step 680, the CPU calculates target control forces Fcti (i=fl, fr, rl and rr) of the active actuators 17FL to 17RR of the wheels based on the unsprung displacements $z_1 ai$ and its time derivatives $dz_1 ai$ by the following equation (8) corresponding to the above equation (6).

$$Fcti = Gpv(\beta_1 \cdot dz_1 ai + \beta_2 \cdot z_1 ai) \tag{8}$$

In step 690, the CPU outputs a control command including the target control forces Fcti to the active actuators 17FL to 17RR of the wheels, so that a control force Fc generated by each active actuator is controlled to be the target control force Fcti. Each active actuator outputs a control force corresponding to the target control force Fcti at the timing when each wheel 11 passes through the corresponding predicted wheel passage position.

The vehicle preview damping control method of the present disclosure includes:

step A in which road surface displacement-related information detected by the road surface displacement-related information detection device and position information capable of identifying a position where the road surface displacement-related information was detected are associated with each other and transmitted to the second control unit, step B in which a road surface displacement-related value related to a vertical displacement of the road surface is calculated based on road surface displacement-related information transmitted from the vehicle or other vehicles, step C in which a set of data of the calculated road surface displacement-related value and corresponding position information associated with each other is stored in a storage device as a part of the database, step D in which the preview damping control is performed using the road surface displacement-related value and position information in the database, and step E in which road surface displacement-related values in a predetermined adjacent region located in a direction crossing a traveling direction of the vehicle with respect to a point where the road surface displacement-related information was detected by the road surface displacement-related information detection device are assumed to be the same as the road surface displacement-related value at the point in at least one of the step in which the data set is stored in the storage device and the step in which the preview damping control is performed.

In the first embodiment, steps 510 to 530 correspond to step A and step 540 corresponds to step B. Step 550 corresponds to step C and steps 610 to 690 correspond to step D. Further, step 560 corresponds to step E. Therefore, these steps execute the preview damping control method for a vehicle of the present disclosure.

Second Embodiment

<Database Making Routine in the Second Embodiment>

Figure 7:
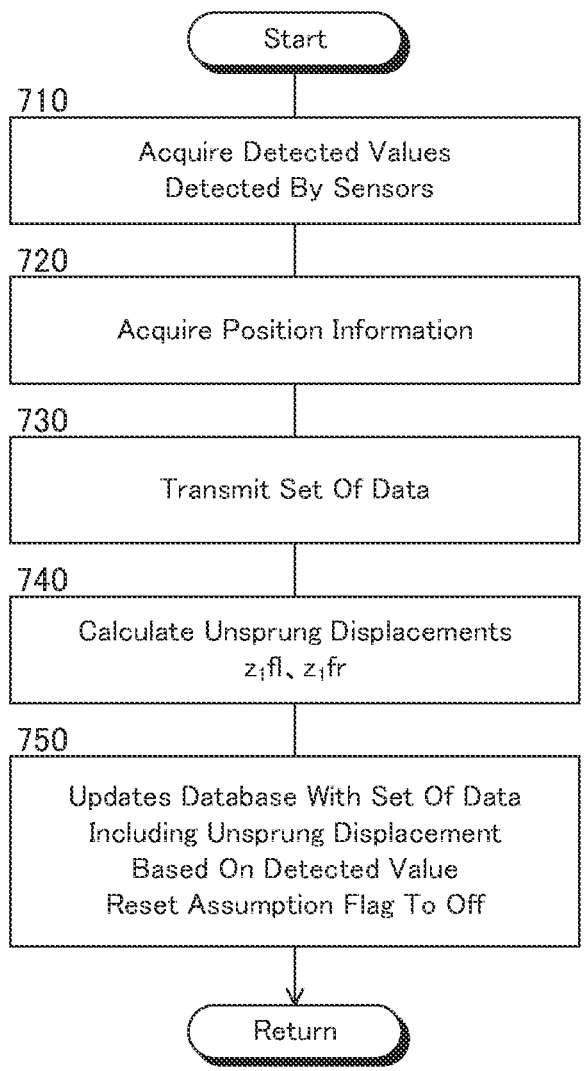
FIG. 7 is a flowchart showing a preview reference database generation routine of the second embodiment.

In the second embodiment, the database making is performed by executing the database making routine shown in the flowchart of FIG. 7 at predetermined elapsed time intervals. Steps 710 to 730 are executed by the CPU of the ECU 30 as in steps 510 to 530, respectively in the first embodiment, and steps 730 to 750 are executed by the CPU of the management server 42 as in steps 530 to 550, respectively in the first embodiment.

Therefore, the description of the database making routine of the second embodiment will be omitted. As can be seen from the comparison between FIGS. 7 and 5, in the second embodiment, the steps corresponding to steps 560 to 580 in the first embodiment are not executed.

<Preview Damping Control Routine in the Second Embodiment>

Figure 8:
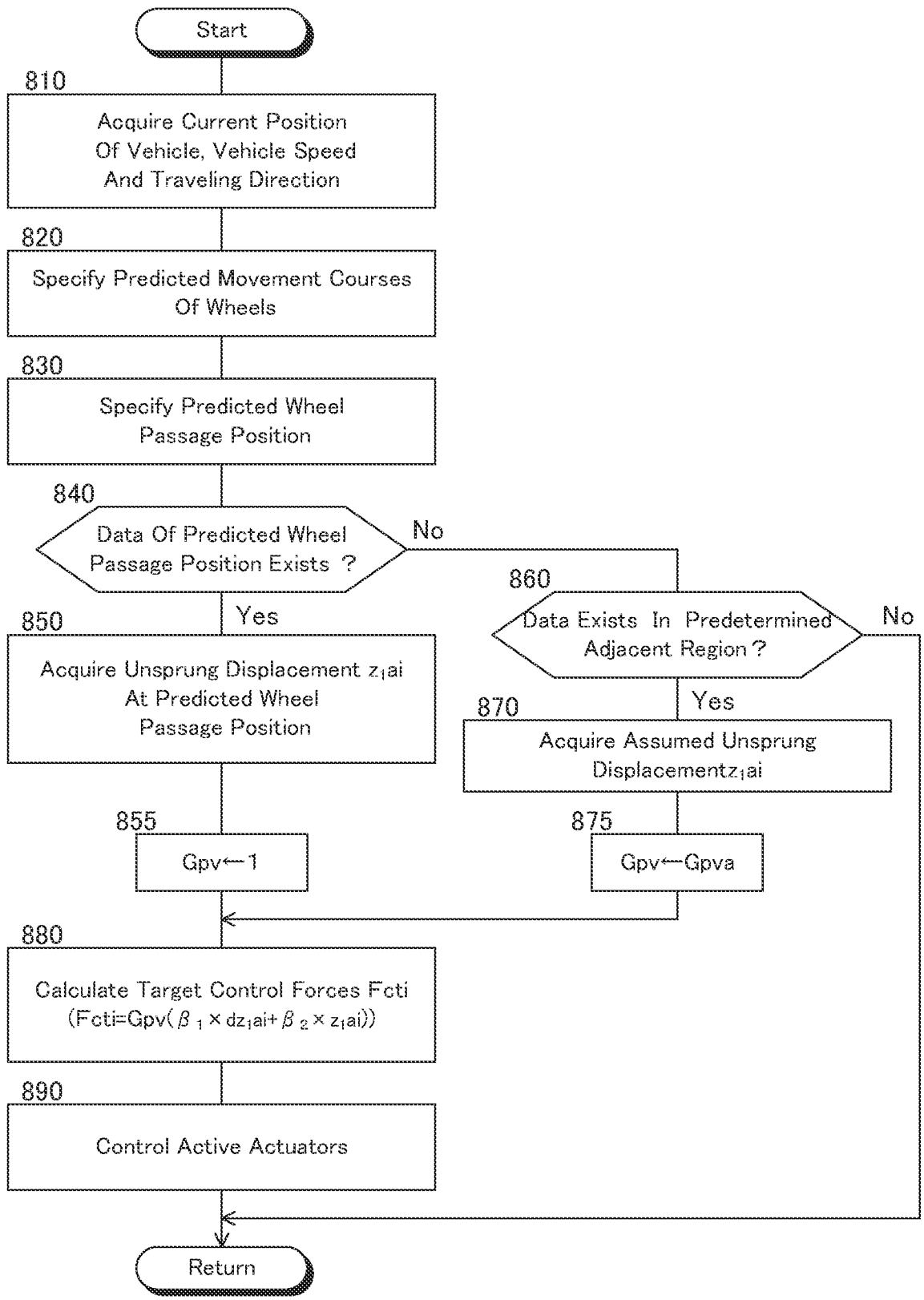
FIG. 8 is a flowchart showing a preview damping control routine of the second embodiment.

In the second embodiment, the preview damping control is executed by executing the damping control routine shown in the flowchart of FIG. 8 by the CPU of the ECU 30 at predetermined elapsed time intervals. The preview damping control in the present embodiment may also be executed for the positions of the left front wheel, the right front wheel, the left rear wheel, and the right rear wheel in this order, for example. Steps 810 to 830 are performed in the same manner as steps 610 to 630, respectively in the first embodiment, and steps 855 and 875 are performed in the same manner as steps 660 and 670, respectively in the first embodiment. Further, steps 880 and 890 are performed in the same manner as steps 680 and 690, respectively in the first embodiment.

When the CPU completes step 830, in step 840, unsprung displacements $z_1 i$ (i=fl, fr, rl and rr) of the road surface sections 64 at the predicted wheel passage position and in the region adjacent thereto are acquired from the database 45. Further, the CPU determines whether or not there is data of the unsprung displacement $z_1 ai$ based on a detected value in the road surface section 64 corresponding to the predicted wheel passage position.

When the CPU makes an affirmative determination, among the unsprung displacement $z_1 i$ acquired from the database 45 in step 850, the CPU acquires an unsprung displacement $z_1 ai$ (i=fl, fr, rl and rr) of the road surface section 64 corresponding to the predicted wheel passage position. Further, the CPU sets the gain Gpv of the preview damping control to 1, which is a standard value, in step 855.

On the other hand, when the CPU makes a negative determination, that is, when it determines that there is no unsprung displacement data based on a detected value in the road surface section 64 corresponding to the predicted wheel passage position, in step 860, the CPU determines whether or not there is an unsprung displacement data based on a detected value in the road surface section adjacent to the road surface section 64 corresponding to the predicted wheel passage position.

Also in the present embodiment, adjacency is the adjacency in a direction perpendicular to a traveling direction of the vehicle V1, but the adjacent direction may be a direction crossing the traveling direction of the vehicle V1, for example, a direction perpendicular to the longitudinal direction of the vehicle V1 or the direction may be perpendicular to the lane. The adjacent range may be different from the adjacent range in the first embodiment.

When the CPU makes a negative determination, in step 860, the CPU temporarily terminates the damping control routine shown in the flowchart of FIG. 8 without executing steps 880 and 890, in other words, without controlling the control force of the preview damping control. Notably, when making a negative determination, the CPU may perform feedback damping control, and may further perform damping control other than preview damping control and feedback damping control.

On the other hand, when the CPU makes an affirmative determination, in step 870, the CPU assumes that an unsprung displacement atf the predicted wheel passage position is the same as an unsprung displacement of the road surface section in the adjacent region (predetermined adjacent region) and acquires the assumed unsprung displacement $z_1 ai$. Further, in step 875, the CPU sets the gain Gpv of the preview damping control to a positive value Gpva smaller than the standard value, for example, 0.8.

Figure 9:
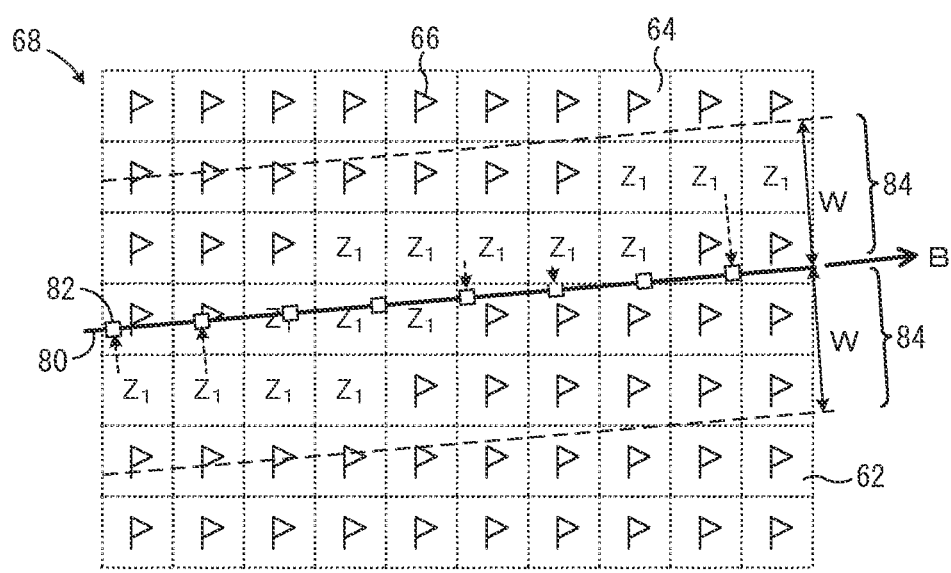
FIG. 9 is a diagram showing a procedure for acquiring an assumed unsprung displacement based on an unsprung displacement calculated based on a detected value in the second embodiment.

FIG. 9 shows an example of how to acquire an assumed unsprung displacement. In FIG. 9, the thick solid line 80 indicates a straight line corresponding to an example of a movement path of a center (not shown) of a ground contact region of a tire of the wheel 11. The square 82 on the thick solid line 80 indicates a predicted passage position of the center of the ground contact region of the tire of the wheel 11. These movement paths and predicted passage positions are determined based on the predicted movement paths of the wheels and the predicted passage positions of the wheels specified in steps 820 and 830, respectively. Further, in FIG. 9, reference numeral 84 indicates predetermined adjacent regions. The widths W of the predetermined adjacent regions 84 on both sides of the thick solid line 80 may have different values.

The arrow B indicates a moving direction of the wheel 11, and for convenience of explanation, it is assumed that the moving direction of the wheel 11 is the same as a traveling direction of the vehicle V1. It is assumed that as shown in FIG. 9, an unsprung displacement $z_1$ based on a detected value is not stored for at least a part of the road surface sections 64 through which the thick solid line 80 passes, and the assumption flag 66 is ON, but an unsprung displacement $z_1$ based on a detected value is stored for at least a part of the road surface sections 64 of the predetermined adjacent regions 84, and the assumption flag 66 is OFF.

As shown by the broken line arrow in FIG. 9, unsprung displacements $z_1$ based on detected values of the road surface sections 64 in the predetermined adjacent regions 84 are copied as unsprung displacements of the road surface sections 64 through which the thick solid line 80 passes. Then, each copied unsprung displacement $z_1$ is stored in the storage device 30a as an assumed unsprung displacement $z_1$ai for the road surface section 64 at the predicted wheel passage position. In this connection, when there is a plurality of unsprung displacements $z_1$ to be copied, only the unsprung displacement of the road surface section closest to the thick solid line 80 may be copied, or an average value of the unsprung displacements of the plurality of road surface sections may be copied. The average value may be a weight average value having a larger weight as a road surface section is closer to the thick solid line 80.

When an unsprung displacement $z_1$ based on a detected value is not stored for the road surface section (referred to as "the road surface section to be controlled") at the predicted wheel passage position, as shown by the broken line arrow in FIG. 9. it is assumed that an unsprung displacement of the road surface section to be controlled is the same as the unsprung displacement of the road surface section in the adjacent region. Further, the preview damping control for the road surface section to be controlled is performed based on a target control force calculated based on the assumed unsprung displacement.

On the other hand, when an unsprung displacement $z_1$ based on a detected value is stored for the road surface section to be controlled, the unsprung displacement is not assumed as not shown by the broken line arrow in FIG. 9. Further, the preview damping control for the road surface section to be controlled is performed based on a target control force calculated based on the stored unsprung displacement.

As described above, the higher a frequency of an unsprung displacement, the narrower the range of the road surface on which an unsprung displacement can be assumed to be the same. Therefore, in step 870, a process of extracting a low frequency component of the unsprung displacement in the predetermined adjacent region, for example, a low-pass filtering process or a moving averaging process may be performed, and the unsprung displacement after the extraction process may be set to an assumed unsprung displacement $z_1$ai.

As in the first embodiment, according to the low frequency component extraction process, even when a road surface is less flat, it is possible to reduce the possibility that an assumed unsprung displacement of a road surface section in a predetermined adjacent region is significantly different from an actual unsprung displacement of the road surface section as compared to where the low frequency component extraction process is not performed. Therefore, it is possible to reduce the possibility that the preview damping control is performed with an inappropriate control force due to a large difference between an assumed unsprung displacement and an actual unsprung displacement.

Further, as described above, a range in which an unsprung displacement can be assumed to be the same may be larger as a wavelength of the unsprung displacement is longer, and the wavelength of the unsprung displacement is larger as a frequency of the unsprung displacement is lower. Therefore, the width W of the adjacent region 84, which is assumed to have the same unsprung displacement, may be variably set so as to increase as a frequency of the component extracted by the extraction process decreases. For example, the width W may be variably set so that the lower the cutoff frequency of the low-pass filtering process or the longer the average period in the moving averaging process, the larger the width W.

According to the variable setting of the width W of the adjacent region 84 described above, in a situation where a flatness of a road surface is high, the width W of the adjacent region 84 can be increased, thereby increasing the range in which an unsprung displacement is assumed to be the same. On the contrary, in a situation where a flatness of a road surface is low, the width W of the adjacent region 78 can be reduced, and it is possible to reduce the possibility that an unsprung displacement assumed for a road surface section in a predetermined adjacent region is significantly different from an actual unsprung displacement of the road surface section.

Notably, when feedback damping control for reducing vibration of a sprung is performed in addition to the preview damping control, a gain of the feedback damping control may be increased without reducing the gain Gpv of the preview damping control in step 875. Further, in step 875, the gain Gpv of the preview damping control may be reduced and the gain of the feedback damping control may be increased. In other words, in a vehicle in which damping control other than the preview damping control is also performed, a control amount of the other damping control may be increased without reducing a preview damping control amount, or the preview damping control amount may be reduced and the other damping control amounts may be increased.

As described above, the preview damping control method for a vehicle of the present disclosure includes steps A to E. In the second embodiment, steps 710 to 730 correspond to step A and step 740 corresponds to step B. Step 750 corresponds to step C, and steps 810 to 855 and steps 880 and 890 correspond to step D. Further, steps 860 to 875 correspond to step E. Therefore, these steps execute the vehicle preview damping control method of the present disclosure.

As can be seen from the above description, according to the first and second embodiments, by pre-reading an unsprung displacement $z_1$ in the preview reference database 45 stored in the storage device 44 by communication and performing preview damping control, vibration of the sprung of the vehicle can be reduced. In particular, the preview damping control can be performed using a set of data for a position where the road surface displacement-related information was detected and a predetermined adjacent region. Therefore, even if a large number of vehicles do not travel on the same road at various lateral positions, an effective unsprung displacement $z_1$ai can be pre-read to dampen a vibration of the sprung.

In particular, according to the first embodiment, when an unsprung displacement $z_1$ is an assumed unsprung displacement, the assumption flag 66 is set to ON. The assumption flag is an identification mark providing identification information indicating the above fact Therefore, when the preview damping control is performed using an unsprung displacement $z_1$ in the database 45, it can be determined by the assumption flag 66 whether or not the unsprung displacement is the unsprung displacement calculated based on detected road surface displacement-related information.

Further, according to the first embodiment, when a set of data in which an unsprung displacement $z_1$ calculated based on a road surface displacement-related information detected when the vehicle or other vehicles traveled and position information are associated with each other for a position in the predetermined adjacent region has been stored in the storage device 44, a set of assumed data is not stored in storage device. Therefore, a set of data that is already stored in the storage device with an unsprung displacement calculated based on detected road surface displacement-related information and position information being associated with each other can be prevented from being overwritten by a set of assumed data to be stored.

Further, according to the first and second embodiments, even when an unsprung displacement $z_1$ai at the predicted wheel passage position is an assumed unsprung displacement, a target preview damping control force can be calculated based on the assumed unsprung displacement, and the preview damping control can be performed based on the target preview damping control force.

Further, according to the first and second embodiments, when it is determined that an acquired unsprung displacement at the predicted wheel passage position is an assumed unsprung displacement, by reducing a target preview damping control force Fcti, a control force generated based on the target preview damping control force is reduced. Therefore, as compared to where a target preview damping control force is not reduced even when an unsprung displacement is an assumed unsprung displacement, it is possible to reduce the possibility that an inappropriately large damping control force is generated.

Further, according to the first and second embodiments, even when an unsprung displacement is an assumed unsprung displacement, a vibration of the sprung can be effectively reduced as compared to where no damping control is performed. In particular, when the control force generated based on the target preview damping control force is reduced in a situation where a road surface displacement-related value is an assumed road surface displacement-related value, a damping control force is supplemented with a control force of the other damping control, so that the risk of insufficient damping control force can be reduced.

Further, according to the first and second embodiments, the preview reference database 45 including a set of data for each road surface section 64 can be stored in the storage device 44. Therefore, as compared to, for example, where a set of data for each point where a road surface displacement-related information is detected and each point in the adjacent region is stored in the storage device as a part of the database, the number of data sets can be reduced and a storage capacity of the storage device can be reduced.

In particular, according to the first embodiment, the assumption of unsprung displacements for positions in predetermined adjacent regions is made in the database control device 104. Therefore, the preview damping control can be efficiently performed in each vehicle as compared with the second embodiment in which the assumption of unsprung displacements for positions in the predetermined adjacent regions is performed in each vehicle.

On the contrary, according to the second embodiment, the possibility of executing the preview damping control can be increased even in a situation where a set of data is not stored in the storage device 44 over the entire width of a road by the preview control of the first embodiment. In other words, even in a situation where there is no unsprung displacement based on a detected value at a predicted wheel passage position, the possibility of executing the preview damping control based on an assumed unsprung displacement can be increased.

[First Modification]

In the first embodiment described above, the assumption flag 66 is used as an identification mark indicating whether or not an unsprung displacement stored in the storage device 44 is an initial value or an assumed unsprung displacement. In the first modification, instead of the assumption flag 66, "the number of times PN that the wheel 11 has passed through each road surface section 64" is used. When the number of times PN is 0, it means that the wheel 11 has not passed, and when the number of times PN is 1 or more, an unsprung displacement $z_1$ based on a detected value has already been stored in the storage device 44 for the road surface section. Therefore, according to the number of times PN, it is not necessary to switch the assumption flag 66 from ON to OFF.

It is to be noted that when the number of times PN is adopted in the first embodiment, in steps 570 and 650, a determination is made whether or not the number of times PN is 0 instead of determining whether or not the assumed flag 66 is ON.

[Second Modification]

The second modification is a modification of the first embodiment. Although no flowchart of this modification is shown, the database making routine and the preview damping control routine are the same as the routines shown in the flowcharts of FIGS. 5 and 6, respectively, except for step 560.

As described above, in step 560 in the first embodiment, as shown in FIG. 4, the black circles 72 and white circles 74 on the thick solid line 70 are copied by moving a predetermined amount on both sides of the thick solid line 70 in a direction perpendicular to the thick solid line. Further, assumed unsprung displacements for the road surface sections 64 are calculated based on the unsprung displacements of the black circles 72 and the white circles 74 after copying, that is, based on the unsprung displacements based on detected values and the complementary unsprung displacements that were copied for the road surface sections 64.

On the other hand, in step 560 in this modification, an unsprung displacement of each road surface section 64 calculated in step 550 is regarded as an unsprung displacement of each road surface section 64 in a predetermined adjacent regions adjacent to the thick solid line 70 in a direction crossing a traveling direction of the vehicle. That is, it is assumed that unsprung displacements of the road surface sections 64 in the predetermined adjacent regions adjacent to the road surface section 64 for which an unsprung displacement based on a detected value is acquired are the same as the unsprung displacement based on the detected value. Notably, when there are a plurality of unsprung displacements that are assumed to be the same, an average value of the plurality of unsprung displacements may be calculated as an assumed unsprung displacement.

The average value may be a weight average value having a larger weight as a road surface section is closer to the thick solid line 70.

According to this modification, it is not necessary to calculate an assumed unsprung displacement based on copied unsprung displacements and the complementary unsprung displacements for each road surface section in a predetermined adjacent region. Therefore, as compared with the first embodiment, an assumed unsprung displacement of each road surface section in a predetermined adjacent region can be acquired more easily.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, a road surface displacement-related value based on road surface displacement-related information is a unsprung displacement, but it may be a road surface displacement.

In the above-described embodiments, the latter half of the database making routine is executed by the management server 42 of the database control device 104 provided outside the vehicle. However, at least part of the latter half of the database making routine may be done on the edge side, i.e. on the vehicle. The database 45 does not have to be stored in the storage device 44 of the cloud 40, and may be stored in the storage device 30a.

Further, in the above-described embodiments, vehicle speed Vv1 information is not transmitted from the in-vehicle device 102 to the database control device 104. However, for example, a vehicle speed Vv1 may be acquired based on a current position of the vehicle V1 acquired by the GNSS receiver, and information on the vehicle speed Vv1 may be transmitted from the in-vehicle device 102 to the database control device 104 as a part of the data set. Further, in that case, the vehicle speed Vv1 information may be associated with the unsprung displacement and the position information and stored in the storage device 44 as a part of the database 45.

Further, in the above-described embodiments, a target control force Fcti of the active actuator 17 is calculated based on an unsprung displacement $z_1ai$ and its time derivative $dz_1ai$ by the above equation (8) corresponding to the above equation (6). However, a target control force Fcti may be simply calculated based on an unsprung displacement $z_1ai$ by the following equation (9) corresponding to the above equation (7).

$$Fcti = Gpv \cdot \beta_2 \cdot z_1 ai \qquad (9)$$

Further, in the above-described embodiments, when the assumption flag 66 is ON, it means that an unsprung displacement stored in the storage device 44 for the corresponding road surface section 64 is an initial value or an assumed unsprung displacement. However, a flag indicating that an unsprung displacement stored in the storage device 44 is an assumed unsprung displacement may be a flag different from the flag indicating that the unsprung displacement is an initial value. When these flags are used, it is possible to identify whether an unsprung displacement stored in the storage device 44 is an assumed unsprung displacement or an initial value.

Further, the first and second embodiments described above may be implemented in combination. For example, the database making routine may be executed according to the routine shown in the flowchart of FIG. 5, and the preview damping control routine may be executed according to the routine shown in the flowchart of FIG. 8.

What is claimed is:

1. A preview damping control apparatus for a vehicle comprising:

an in-vehicle control device including a road surface displacement-related information detection device that detects road surface displacement-related information related to a vertical displacement of at least one of a position of a wheel and a position in front of the wheel while the vehicle is travelling, and a first control unit that controls the road surface displacement-related information detection device, a preview reference database control device including a storage device that stores a preview reference database and a second control unit that controls the storage device, the first control unit is configured to associate the road surface displacement-related information detected by the road surface displacement-related information detection device with a position information capable of identifying a position where the road surface displacement-related information was detected, and send the associated information to the second control unit, the second control unit is configured to calculate a road surface displacement-related value related to a vertical displacement of a road surface based on detected road surface displacement-related information transmitted from the vehicle or other vehicles, and store a set of data of the road surface displacement-related value and corresponding position information associated with each other in the storage device as a part of the preview reference database, and the first control unit is further configured to perform preview damping control for reducing vibration of a sprung of the vehicle by using the road surface displacement-related value and the position information in the preview reference database, wherein at least one of the first and second control units is configured to assume that a road surface displacement-related value in a predetermined adjacent region located in the direction crossing a traveling direction of the vehicle with respect to a point where the road surface displacement-related information was detected by the road surface displacement-related information detection device is the same as a road surface displacement-related value at the point, wherein the second control unit is configured to store a set of assumed data in which an assumed road surface displacement-related value and position information capable of specifying a position in a predetermined adjacent region are associated with each other for the predetermined adjacent region in the storage device as a part of the preview reference database.

2. The preview damping control apparatus for a vehicle according to claim 1, wherein the second control unit is configured to store the set of assumed data together with identification information indicating that the road surface displacement-related value is the assumed road surface displacement-related value in the storage device as a part of the preview reference database when storing the set of assumed data in the storage device as a part of the preview reference database.

3. The preview damping control apparatus for a vehicle according to claim 1, wherein the second control unit is configured not to store the set of assumed data in the storage device when it is determined that a set of data in which a road surface displacement-related value calculated based on a road surface displacement-related information detected when the vehicle or other vehicles traveled and the position information are associated with each other for a position in the predetermined adjacent region has already been stored in the storage device.

4. The preview damping control apparatus for a vehicle according to claim 1, wherein the second control unit is configured to extract a low frequency component of the assumed road surface displacement-related value by an extraction process, and store a set of data of the assumed road surface displacement-related value after the extraction process and the corresponding position information associated with each other in the storage device as a part of the preview reference database.

5. The preview damping control apparatus for a vehicle according to claim 4, wherein the second control unit is configured to variably set a size of the predetermined adjacent region in the direction crossing the traveling direction of the vehicle so that the lower a frequency of the component extracted by the extraction process, the larger the size of the predetermined adjacent region.

6. The preview damping control apparatus for a vehicle according to claim 1, wherein the second control unit stores road surface section information in which a road surface of each road in the preview reference database is divided into a plurality of road surface sections in advance, and is configured to store position information that can identify a road surface section in the storage device as position information corresponding to a calculated road surface displacement-related value.

7. The A preview damping control apparatus for a vehicle comprising:
an in-vehicle control device including a road surface displacement-related information detection device that detects road surface displacement-related information related to a vertical displacement of at least one of a position of a wheel and a position in front of the wheel while the vehicle is travelling, and a first control unit that controls the road surface displacement-related information detection device,
a preview reference database control device including a storage device that stores a preview reference database and a second control unit that controls the storage device,
the first control unit is configured to associate the road surface displacement-related information detected by the road surface displacement-related information detection device with a position information capable of identifying a position where the road surface displacement-related information was detected, and send the associated information to the second control unit,
the second control unit is configured to calculate a road surface displacement-related value related to a vertical displacement of a road surface based on detected road surface displacement-related information transmitted from the vehicle or other vehicles, and store a set of data of the road surface displacement-related value and corresponding position information associated with each other in the storage device as a part of the preview reference database, and
the first control unit is further configured to perform preview damping control for reducing vibration of a sprung of the vehicle by using the road surface displacement-related value and the position information in the preview reference database, wherein at least one of the first and second control units is configured to assume that a road surface displacement-related value in a predetermined adjacent region located in the direction crossing a traveling direction of the vehicle with respect to a point where the road surface displacement-related information was detected by the road surface displacement-related information detection device is the same as a road surface displacement-related value at the point, wherein
the vehicle has a control force generator configured to generate a control force acting between the sprung and an unsprung, and
the first control unit is configured to determine a predicted wheel passage position through which a wheel is predicted to pass, acquire a road surface displacement-related value or an assumed road surface displacement-related value at the predicted wheel passage position in the preview reference database by communication, calculate a target preview damping control force for reducing a vibration of the sprung when the wheel passes through the predicted wheel passage position based on the acquired road surface displacement-related value or the acquired assumed road surface displacement-related value, and control the corresponding control force generator so that a control force generated by the control force generator when the wheel passes through the predicted wheel passage position becomes the target preview damping control force.

8. The preview damping control apparatus for a vehicle according to claim 7, wherein the first control unit is configured to extract a low frequency component of an assumed road surface displacement-related value by an extraction process when the first control unit acquires the assumed road surface displacement-related value by communication, and calculate a target preview damping control force for reducing a vibration of the sprung when the wheel passes through the predicted wheel passage position based on the assumed road surface displacement-related value after the extraction process.

9. The preview damping control apparatus for a vehicle according to claim 8, wherein the first control unit is configured to variably set a size of the predetermined adjacent region in the direction crossing the traveling direction of the vehicle so that the lower a frequency of the component extracted by the extraction process, the larger the size of the predetermined adjacent region.

10. The preview damping control apparatus for a vehicle according to claim 7, wherein the first control unit is configured to reduce the target preview damping control force when it is determined that a road surface displacement-related value at the predicted wheel passage position acquired by communication is an assumed road surface displacement-related value.

11. The preview damping control apparatus for a vehicle according to claim 7, wherein
the in-vehicle control device is configured to perform other damping control that calculates other target damping control force other than the target preview damping control force, and control the control force generator so that a control force generated by the control force generator when the wheel passes through the predicted wheel passage position becomes the other target damping control force, and
the first control unit is configured to increase a control force generated based on the other target damping control force when it is determined that the road surface displacement-related value at the predicted wheel passage position acquired by communication is the assumed road surface displacement-related value.

12. A preview damping control method for a vehicle for reducing a vibration of a sprung of the vehicle using:
an in-vehicle control device including a road surface displacement-related information detection device that detects road surface displacement-related information related to a vertical displacement of at least one of a position of a wheel and a position in front of the wheel while the vehicle is travelling, and a first control unit that controls the road surface displacement-related information detection device, and
a preview reference database control device including a storage device that stores a preview reference database and a second control unit that controls the storage device, wherein
the damping force control method comprises:
a step of associating road surface displacement-related information detected by the road surface displacement-related information detection device with position information capable of identifying a position where the road surface displacement-related information was detected and transmitting the associated information to the second control unit,
a step of calculating a road surface displacement-related value related to a vertical displacement of a road surface based on road surface displacement-related information transmitted from the vehicle or other vehicles,
a step of storing a set of data of the calculated road surface displacement-related value and the corresponding position information associated with each other in the storage device as a part of the preview reference database,
a step of performing preview damping control using the road surface displacement-related information and the position information in the preview reference database, and
a step of assuming that a road surface displacement-related value in a predetermined adjacent region located in a direction crossing a traveling direction of the vehicle with respect to a point where the road surface displacement-related information was detected by the road surface displacement-related information detection device is the same as a road surface displacement-related value at the point in at least one of the step of storing the set of data in the storage device and the step of performing the preview damping control,
a step of storing a set of assumed data in which an assumed road surface displacement-related value and position information capable of specifying a position in a predetermined adjacent region are associated with each other for the predetermined adjacent region in the storage device as a part of the preview reference database.

* * * * *